(12) United States Patent
Manabe et al.

(10) Patent No.: US 6,895,328 B2
(45) Date of Patent: May 17, 2005

(54) VEHICLE NAVIGATION SYSTEM AND RELATED SOFTWARE PROGRAM

(75) Inventors: Daisuke Manabe, Kariya (JP); Takamitsu Suzuki, Okazaki (JP)

(73) Assignee: Denso Corporation, Kariya (JP)

( * ) Notice: Subject to any disclaimer, the term of this patent is extended or adjusted under 35 U.S.C. 154(b) by 77 days.

(21) Appl. No.: 10/318,131

(22) Filed: Dec. 13, 2002

(65) Prior Publication Data

US 2004/0204834 A1 Oct. 14, 2004

(30) Foreign Application Priority Data

Dec. 14, 2001 (JP) .................................... 2001-381753

(51) Int. Cl.$^7$ .............................................. G01C 21/30
(52) U.S. Cl. .................. 701/208; 701/211; 340/995.14
(58) Field of Search ................. 701/208, 210, 701/211, 206; 342/357.13, 357.17; 340/995.14, 995.17, 995.24, 995.27

(56) References Cited

U.S. PATENT DOCUMENTS

| | | | |
|---|---|---|---|
| 5,237,323 A | | 8/1993 | Saito et al. |
| 5,724,243 A | * | 3/1998 | Westerlage et al. ...... 455/456.5 |
| 5,908,465 A | * | 6/1999 | Ito et al. ..................... 701/211 |
| 5,938,721 A | * | 8/1999 | Dussell et al. .............. 701/211 |
| 6,141,610 A | * | 10/2000 | Rothert et al. ................. 701/35 |
| 6,339,745 B1 | * | 1/2002 | Novik .......................... 701/208 |
| 6,392,548 B2 | * | 5/2002 | Farringdon et al. ...... 340/573.1 |
| 6,680,675 B1 | * | 1/2004 | Suzuki ........................ 340/988 |
| 6,691,029 B2 | * | 2/2004 | Hughes et al. .............. 701/204 |
| 2002/0123840 A1 | * | 9/2002 | Obata et al. ................. 701/207 |

FOREIGN PATENT DOCUMENTS

| | | |
|---|---|---|
| JP | 4-218088 | 8/1992 |
| JP | 6-348988 | 12/1992 |
| JP | A-H11-83531 | 3/1999 |
| JP | 11-148833 | 6/1999 |
| JP | A-2000-337893 | 12/2000 |
| JP | A-2001-050760 | 2/2001 |
| JP | A-2001-108466 | 4/2001 |
| JP | A-2003-14475 | 1/2003 |

* cited by examiner

Primary Examiner—Michael J. Zanelli
(74) Attorney, Agent, or Firm—Posz Law Group, PLC

(57) ABSTRACT

A vehicle navigation system includes a computer-based control unit with a display unit. A group of regions or spots on a given map are designated beforehand as on-map targets. A judgement is made as to whether a predetermined condition for each on-map target, having been set beforehand, is fulfilled or not based on vehicle traveling conditions. The result of judgement is memorized. A user is informed directly or indirectly of the present status as to fulfillment/nonfulfillment of the predetermined condition for each on-map target based on the judgement information.

67 Claims, 10 Drawing Sheets o···· SIGHTSEEING SPOTS

BLACK OUT AICHI PREFECTURE

THEN, BLACK OUT GIFU PREFECTURE

FURTHER, BLACK OUT NAGANO PREFECTURE

VEHICLE NAVIGATION SYSTEM AND RELATED SOFTWARE PROGRAM

BACKGROUND OF THE INVENTION

This invention relates to a vehicle navigation system, and more particularly to a vehicle navigation system which is capable of inspiring user's wants or desires for driving.

A conventional vehicle navigation system has the capability of detecting the present position of a traveling vehicle based on geographical information supplied from the well-known global positioning system (GPS), calculating for the routing of the vehicle connecting the present position to a goal point (i.e., destination) based on the detected position of the vehicle, and providing a sound route guidance along the determined route.

Recent advancement or development in the semiconductor technologies enables this kind of vehicle navigation system to store various kinds of information or data to enhance the functions of this system.

For example, well known is a memory function for storing the places designated on a map as memory spots. The memory function allows a user to simply utilize such memory spots as a goal or transit point for route guidance.

U.S. Pat. No. 5,237,323 discloses a map retrieving system according to which a specific local area having been often referred to in the past is displayed with higher priority. This technique will give a great assistance to a user who wants to quickly find his/her target place.

Japanese Patent Application Laid-open No. 11-148833 discloses a navigation system which automatically judges the familiarity with each road on which a vehicle is running and provides a map display for route guidance which especially places emphasis on the case a driver is unfamiliar with the road that the vehicle is currently running.

Japanese Patent Application Laid-open No. 6-348988 discloses a recording system capable of automatically storing the record of driving, such as transit points, traveling regions, distances, famous places, total traveling distances, to enhance the usability of a navigation system.

The efforts to provide such convenient and user-friendly navigation systems will lead to wide spread use of the systems and also bring great advancement in the relevant technological fields.

However, all of the above-described conventional systems are rather passive in the sense that these systems work properly only when they are used with some intents. For example, according to the recording system disclosed in Japanese Patent Application Laid-open No. 6-348988, the record of driving can not be obtained until a user drives a vehicle for the purpose of collecting the data of driving.

SUMMARY OF THE INVENTION

In view of the above-described problems, the present invention has an object to provide a vehicle navigation system of an intelligent type. In this respect, it is desirable that the vehicle navigation system can provide concrete targets to be attained. For example, providing the information relating to sightseeing spots or the like will be appreciated by the users who have no special places to go when they drive a vehicle.

To this end, the present invention provides a vehicle navigation system which can utilize memory function of storing various information or data based on vehicle driving conditions and can present concrete targets to go for in such a manner that user's wants or desires for driving are inspired.

In order to accomplish the above and other related objects, the present invention provides a vehicle navigation system possessing information storing capability which includes a judging and memorizing means and an informing means. A group of regions or spots on a given map are designated beforehand as on-map targets. The judging and memorizing means is for making a judgement as to whether a predetermined condition for each on-map target is fulfilled or not based on vehicle traveling conditions and for memorizing judgement information obtained as a result of the judgement. The informing means is for directly or indirectly informing a user of the present status as to fulfillment/nonfulfillment of the predetermined condition for each on-map target based on the judgement information memorized by the judging and memorizing means.

More specifically, a group of regions being designated as on-map targets of this invention include all of municipal regions, such as prefectures, cities, towns, and villages. For example, the condition for each on-map target is judged to be fulfilled when the vehicle enters into an objective region. The present status as to fulfillment/nonfulfillment of the condition for each on-map target is explicitly displayed on a screen of a display unit. The driver, with a feeling like playing a game, will try to fulfill the given conditions on the way to a goal (i.e., destination) of the driving. This brings joy and sure route guidance to the driver.

Namely, the present invention presents a predetermined condition to be fulfilled for each on-map target to encourage the driver to attain this. Thus, the driver's wants or desires for driving are inspired.

Furthermore, a group of spots being designated as on-map targets of this invention include any spots discriminable or displayable on a map. For example, various facilities, such as restaurants, convenient shops, or famous spots, at which drivers may stop to interrupt their driving are the spots to be designated as on-map targets.

Meanwhile, the regions to be designated as on-map targets are arbitrary areas on a map which are surrounded by border lines. Therefore, in addition to the above-described municipal regions including prefectures, cities, towns, and villages, the on-map target regions of the present invention will include any dissectable regions on a map.

From the reasons described above, it is preferable that the vehicle navigation system further includes a setting means for setting the group of regions or spots on the given map as the on-map targets. Furthermore, it is preferable that the vehicle navigation system further includes a condition setting means for setting the predetermined condition.

Furthermore, it is preferable for the vehicle navigation system of the present invention that the predetermined condition is fulfilled upon vehicle arriving at or entering into the each on-map target.

It is also preferable for the vehicle navigation system of the present invention that fulfillment of the predetermined condition is checked based on a period of time during which a vehicle is positioned on the on-map target.

More specifically, it is possible to measure a time required for the vehicle to stay at an objective on-map target spot or passing through the objective on-map target region. When the measured time exceeds a predetermined time, it is judged that the condition for this on-map target is fulfilled.

It is also preferable for the vehicle navigation system of the present invention that fulfillment of the predetermined condition is checked based on a traveling distance when the on-map target represents a predetermined region. In this case, the condition of a specific on-map target region may not be attained when the vehicle soon goes out of this region.

The informing means indicates, directly or indirectly, the present status as to fulfillment/nonfulfillment of the predetermined condition for each on-map target. Regarding direct indication for expressing the present status as to fulfillment/ nonfulfillment, it will be preferable to express the degree of fulfillment in terms of percentage or ratio, like 30% or 7/10. Regarding indirect indication, it may be preferable to provide a map display for the comparison between the number of on-map regions having already been fulfilled their conditions and the number of on-map regions having not been fulfilled their conditions yet. Needless to say, the informing means can be associated with a speaker so as to provide a voice guidance, and also can be associated with a display unit for displaying on its screen the up-to-date status as to fulfillment/nonfulfillment of the predetermined condition for each on-map target.

Furthermore, it is preferable for the vehicle navigation system of the present invention that the informing means gives a map display so that fulfillment/nonfulfillment of the predetermined condition for each on-map target is discriminable from others on a map. With this arrangement, all of the on-map targets having not been fulfilled their conditions yet can be perceived, at a glance, by a user. This will bring the effect of inspiring user's wants or desires for driving.

Regarding the map display, it is preferable that the informing means displays a map on which the group of regions or spots are distinctively shown, and gives the map display according to which fulfillment/nonfulfillment of the predetermined condition for each on-map target is discriminable from others on a map. For example, icons will be preferably used for explicitly showing respective on-map target spots. Border lines will be preferably used for distinctly showing respective on-map target regions. In this case, it is preferable that a color adopted for representing the on-map target is changed considering the present status as to fulfillment/nonfulfillment of the predetermined condition for each on-map target. The user can easily perceive the fulfillment/nonfulfillment of the predetermined condition for each on-map target.

Furthermore, for the assistance to users, it is preferable for the vehicle navigation system of the present invention that a on-map target informed by the informing means is usable as a goal or transit point for route guidance.

Furthermore, it is preferable for the vehicle navigation system of the present invention that the judging and memorizing means further memorizes additional information with respect to fulfillment/nonfulfillment of the predetermined condition for each on-map target, and the informing means informs the additional information in connection with a corresponding on-map target. For example, the additional information is a number of times with respect to fulfillment of the predetermined condition for each on-map target. Another additional information may be time information (e.g., date/time) with respect to fulfillment of the predetermined condition for each on-map target. The time information may be only date of fulfillment or only a time (hour, minute), or both of date and time.

Regarding the display of additional information, it is preferable for the vehicle navigation system of the present invention that the informing means displays the additional information on or beside a corresponding on-map target on a map. When the on-map target is a region, it is preferable to display, for example as a superimposed image, the number of times and date/time with respect to fulfillment of the predetermined condition for each on-map target.

Furthermore, it is preferable for the vehicle navigation system of the present invention that the informing means changes a display pattern of the on-map target based on the additional information in contrast with those of other on-map targets. For example, color, type, and/or size (i.e., thickness) of the boundary lines surrounding each on-map target region can be changed so as to explicitly show the present status with respect to fulfillment/nonfulfillment of the predetermined condition for each on-map target.

Functions of the above-described various means of the vehicle navigation system of the present invention can be realized by a computer. To this end, the present invention provides a software program used for the above-described vehicle navigation system of an intelligent type. The software program of the present invention includes at least two steps. The first step is for making a judgement as to whether a predetermined condition for each on-map target is fulfilled or not based on vehicle traveling conditions and for memorizing judgement information obtained as a result of the judgement, when a group of regions or spots on a given map are designated beforehand as on-map targets. And, the second step is for directly or indirectly informing a user of the present status as to fulfillment/nonfulfillment of the predetermined condition for each on-map target based on the judgement information.

The software program of the present invention can be stored in a portable recording medium, such as floppy disk (i.e., FD), magneto-optical (i.e., MO) disk, digital video or versatile disk (i.e., DVD), compact disc read-only memory (i.e., CD-ROM), and external hard disk drive (i.e., HDD), or in a stationary recording medium, such as built-in hard disk drive (i.e., HDD). The computer can read necessary data and programs from these recording media. If desirable, some of the data and programs can be loaded into the computer, namely, can be stored in a ROM or in a backup RAM of the computer.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

Figure 1:
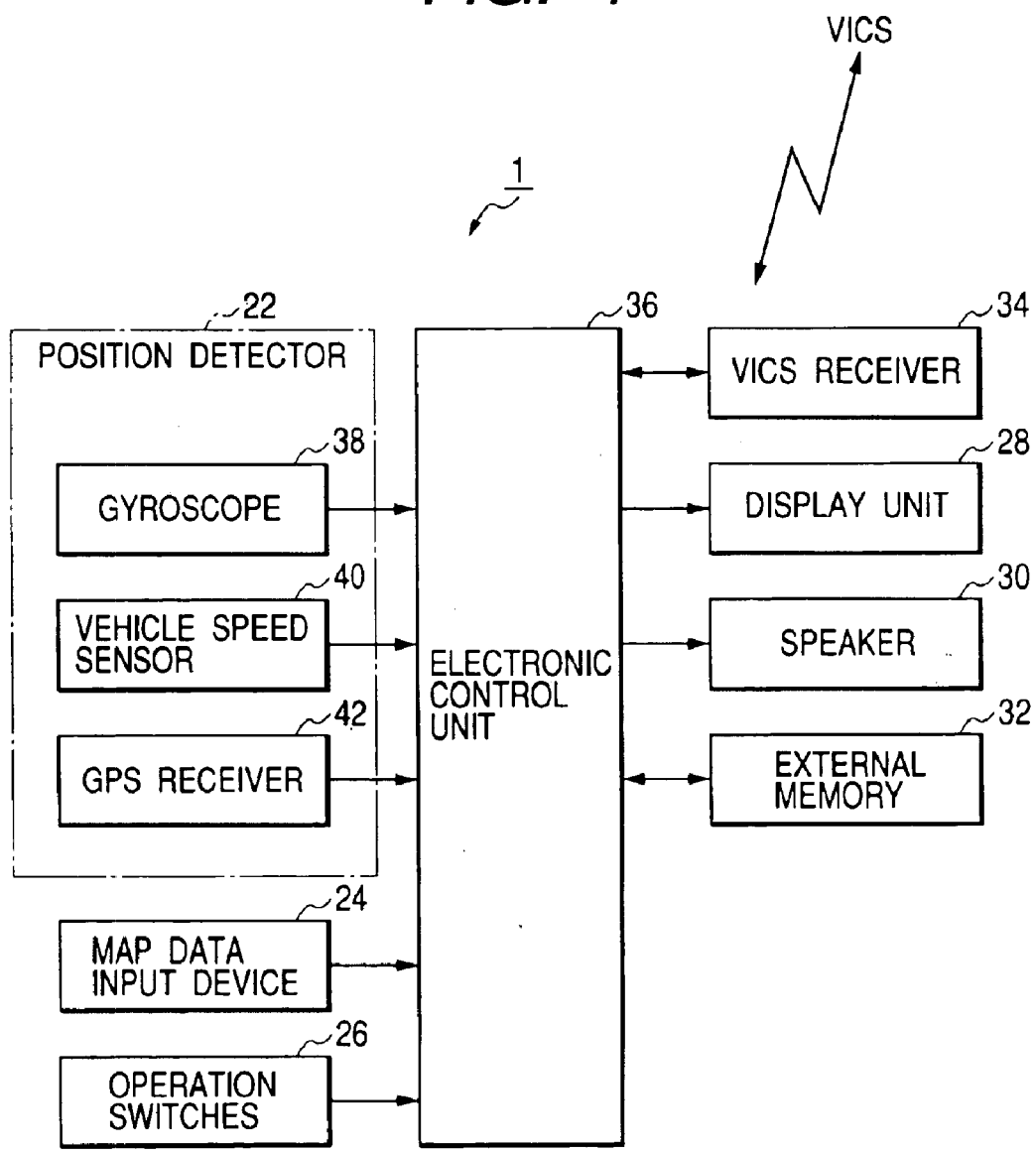
FIG. 1 is a schematic diagram showing the overall arrangement of a vehicle navigation system in accordance with a preferred embodiment of the present invention.

A preferred embodiment of the present invention will be explained hereinafter with reference to attached drawings. Identical parts are denoted by the same reference numerals throughout the drawings.

FIG. 1 is a schematic diagram showing the overall arrangement of a vehicle navigation system in accordance with a preferred embodiment of the present invention.

A vehicle navigation system 1 includes a position detector 22, a map data input device 24, a group of operation switches 26, a display unit 28, a speaker 30, an external memory 32, a VICS receiver 34, and an electronic control unit (i.e., ECU) 36.

The position detector 22 includes a well-known gyroscope 38, a vehicle speed sensor 40, and a GPS receiver 42. The GPS receiver 42 is associated with a global positioning system (GPS) which detects or identifies a vehicle position based on a radio wave transmitted from a satellite. These sensors 38, 40, and 42 possess inherent errors different from each other in their properties, and are therefore interpolated by each other during their use in this system. It is however possible to eliminate one or two of these sensors 38, 40, and 42 as long as the position detector 22 can perform functions as required. On the contrary, to increase the measuring accuracy in the position detecting operation, it is possible to add another sensors, such as a geomagnet sensor, an angle sensor for detecting a rotational angle of a steering wheel, or a speed sensor detecting the rotational speed of each while.

The map data input device 24 inputs map data into the electronic control unit 36 from a recording medium. The map data include road identifying data representing the types or names of respective roads as well as map matching data prepared for improving the position measuring accuracy. The recording or storing medium for storing the map data is, for example, a CD-ROM or a DVD-ROM which is selectable depending on the data storing capacity required. A memory card or any other portable medium can be also used for the storing medium of the present invention. Alternatively, a hard disk or a comparable stationary device can be also used for the storing medium of the present invention.

The group of operation switches 26 consist of various switches which allow a user to input various information or data to operate the vehicle navigation system 1. According to this embodiment, the operation switches 26 are touch or panel switches integrated with the display unit 28 in addition to other mechanical switches on a hand-operated controller or the like. It is also preferable to allow another user in a rear seat of the passenger compartment to operate the navigation system 1. In this case, it is desirable that the navigation system 1 includes a signal receiving section for receiving a signal transmitted from a remote controller.

The display unit 28 is a color display unit with a display screen on which a present vehicle position mark, when entered from the position detector 22, is superimposed on a map entered from the map data input device 24.

The speaker 30 has the capability of generating a voice message for informing the user of various information. The visual image displayed on the display unit 28 and the voice message generated from the speaker 30 cooperatively give a route guidance to the user. For example, when the navigation system 1 judges that a vehicle needs to turn right, the display unit 28 displays an image of an intersection with an arrow or comparable sign indicating the direction to advance while the speaker 30 generates a voice message such as "Turn right at the next intersection." Giving a voice message enables a driver to concentrate on steering, braking, or any other operations for driving the vehicle, because the driver is not forced to fix his/her eyes on the screen of the display unit 28. This assures safety in driving when the driver confirms traffic information with respect to a spot being set.

The external memory 32 stores or memorizes on-map targets serving as later-described on-map spots or regions in addition to various information relevant to the on-map targets. The external memory 32 is, for example, a hard disk device or a semiconductor memory device.

The VICS receiver 34 receives information supplied from the VICS (i.e., Vehicle Information and Communication System).

The electronic control unit 36 is an ordinary computer incorporating a CPU (i.e., central processing unit), a ROM (i.e., read only memory), a RAM (i.e., random access memory), an I/O (i.e., input/output) device, and a bus line connecting these components. The electronic control unit 36 controls the display unit 28, the speaker 30, and the external memory 32 based on the input signals entered from the position detector 22, the map data input device 24, and the operation switches 26. The electronic control unit 36 sets a driving route connecting the present point to a destination, and provides route guidance along the driving route being thus set. Furthermore, according to this embodiment, the electronic control unit 36 sets a group of spots or regions on the map as on-map targets. The electronic control unit 36 judges whether the conditions for respective on-map targets being thus set are satisfied or not. Then, the electronic control unit 36 informs the user of the result of the judgement, i.e., fulfillment or nonfulfillment of the conditions.

The navigation system 1 is characterized in the above-described procedures performed in the electronic control unit 36: i.e., the processing for setting on-map targets; the processing for judging the fulfillment of the given conditions, and the processing for information the fulfillment or nonfulfillment of the conditions, which are hereinafter explained in more detail.

Figure 2:
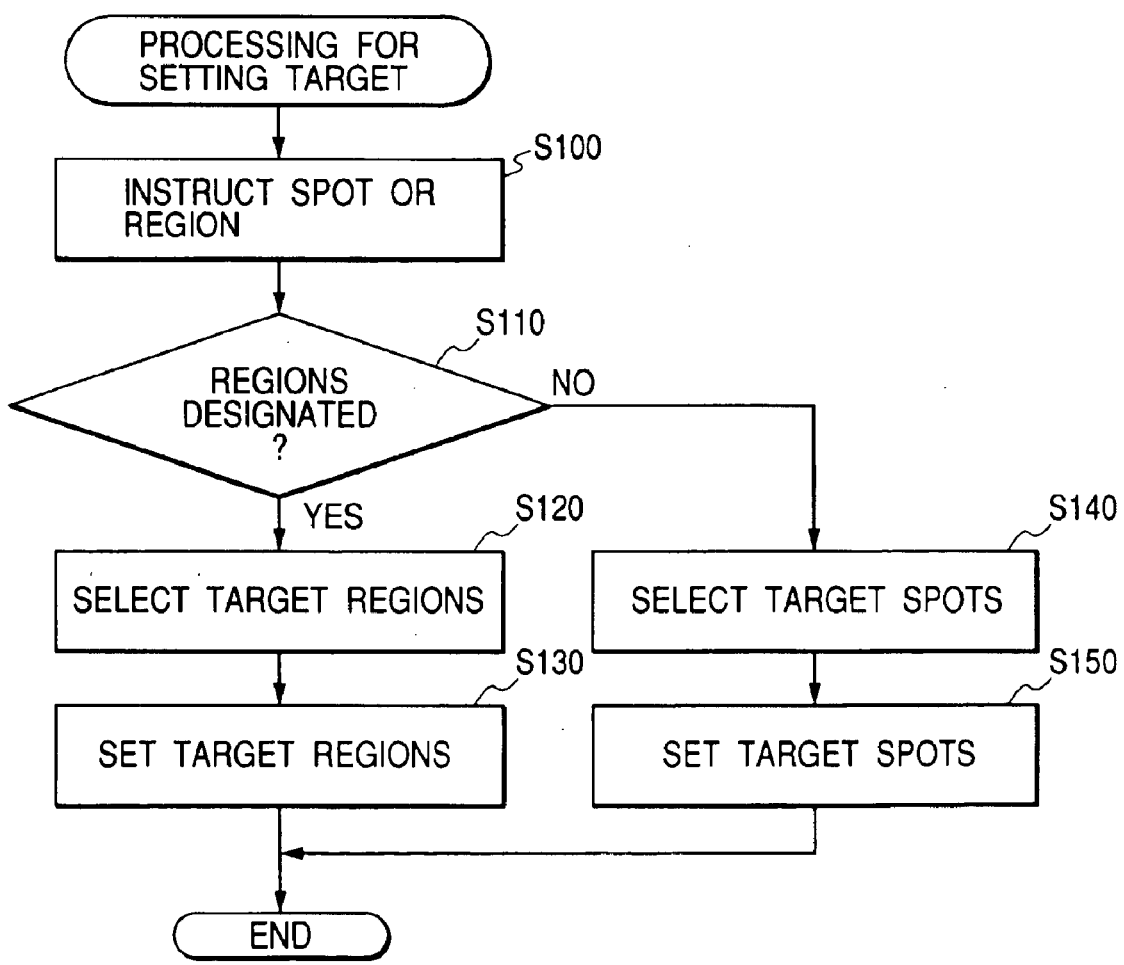
FIG. 2 is a flowchart showing the processing for setting on-map targets in accordance with the preferred embodiment of the present invention.

FIG. 2 is a flowchart showing the processing for setting on-map targets in accordance with the preferred embodiment of the present invention. This processing is executed when a user selects it from a setting menu.

First of all, in step S100, the user is asked to instruct, about his/her preference with respect to the on-map targets, either a group of spots or a group of regions.

Next, in step S110, it is judged as to whether the user prefers on-map target regions to on-map target spots. When on-map target regions are selected by the user (i.e., YES in step S110), the control flow proceeds to step S120. On the other hand, when the user prefers on-map target spots to on-map target regions (i.e., NO in step S110), the control flow proceeds to step S140.

In the step S120, the user is asked to designate a plurality of concrete regions as on-map target regions according to his/her preference which may come up to mind. The regions to be designated in this case include any areas dissected on a map with border lines surrounding them. For example, the dissected regions on a map may be prefectures of Japan. In some cases, there are particular roads on map which are defined as link data. These specific roads may also serve as the on-map target regions to be designated, in this embodiment.

In this selection, it may be suitable to let each user select each favorite one of items listed on a menu screen shown on the screen of display unit 28 which includes all of the municipal regions, such as prefectures, cities, towns, and villages in Japan as well as main roads in this country and in each prefecture.

Figure 3:
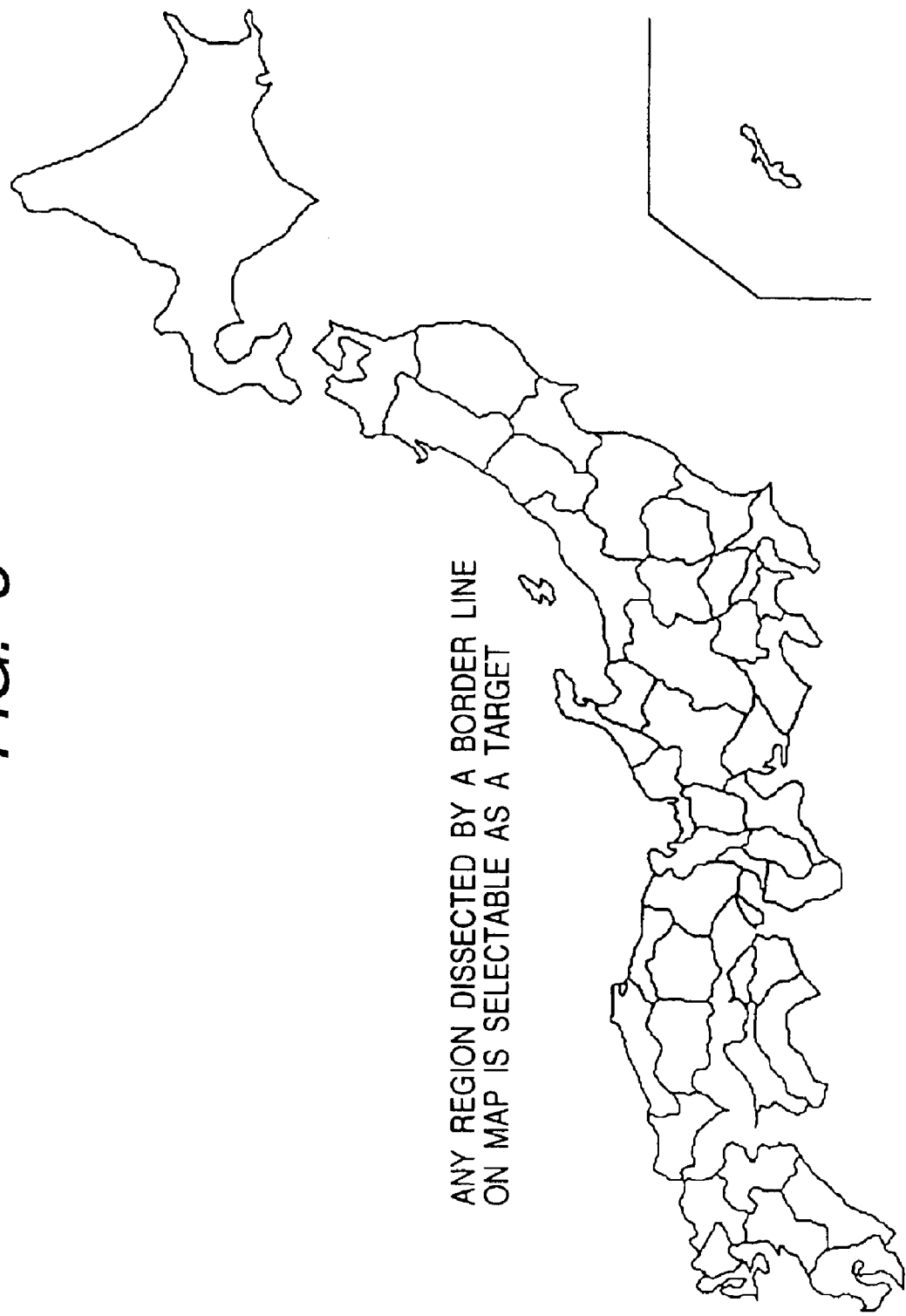
FIG. 3 is a diagram showing dissected regions to be selected as target regions on a map.
Figure 4:
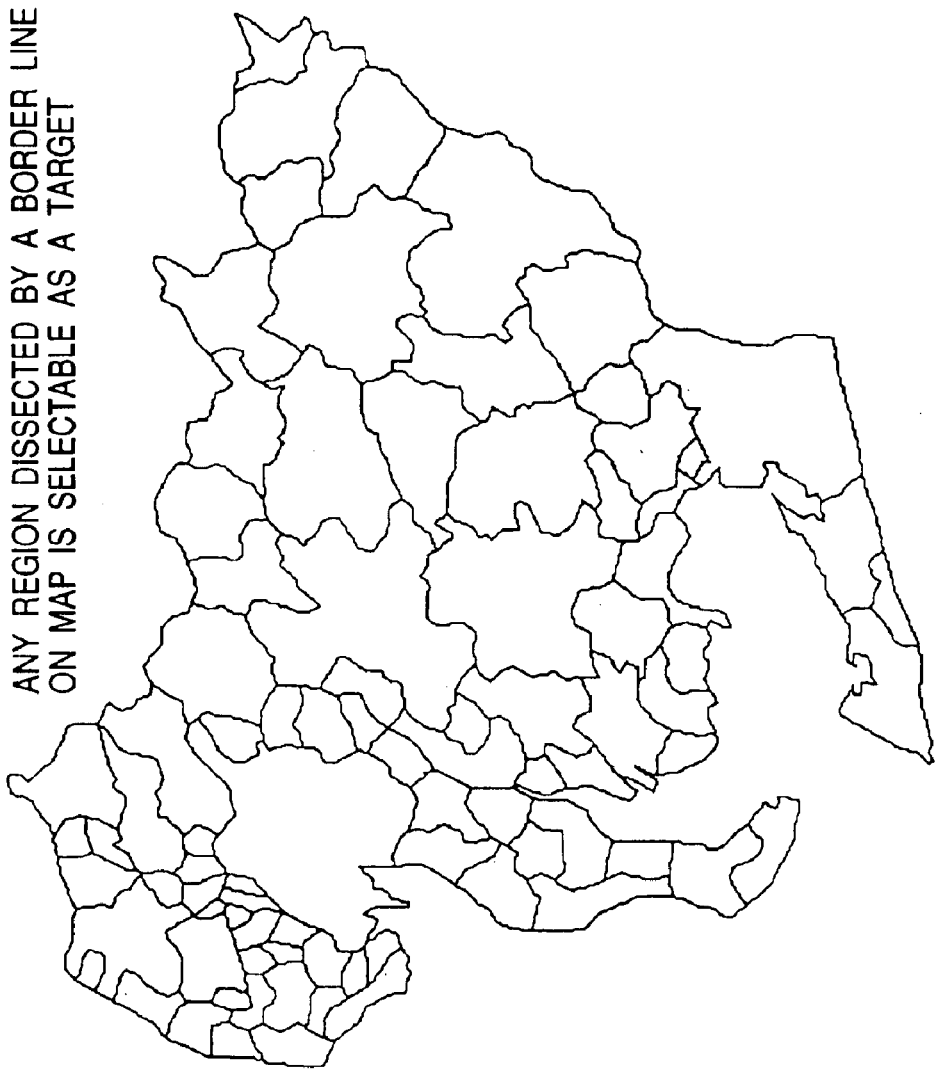
FIG. 4 is a diagram showing dissected regions to be selected as target regions on a map.

When the user selects the prefectures on the menu screen, the display unit 28 shows all of the prefectures of Japan respectively serving as on-map target regions as shown in FIG. 3. When the user selects the cities/towns/villages, the display unit 28 shows all of administrative regions in each prefecture respectively serving as on-map target regions as shown in FIG. 4.

However, the dissection of the municipal regions is not limited to the above-described ones. For example, it is possible to divide the whole area of Japan into more larger sections, such as Kanto Region, Chubu Region and others. Needless to say, similar modification is applicable to the dissection of the whole area in each prefecture. The border lines displayed on the map are not limited to municipal boundaries and therefore can be used for representing any other distinctive areas.

Namely, in step S130, the display unit 28 shows on its screen the selected regions as the designated on-map target regions. At the same time, judgement information for each of the designated on-map target regions is stored in the external memory 32. The judgement information stored in this case includes the conditions having been not fulfilled yet. After accomplishing the step S130, the processing for setting on-map target regions ends.

On the other hand, when the user prefers on-map target spots to on-map target regions (i.e., NO in step S110), the control flow proceeds to step S140.

Figure 5:
FIG. 5 is a diagram showing several spots to be selected as target spots on a map.

In the step S140, the user is asked to designate a plurality of concrete spots as the on-map targets according to his/her preference which may come up to mind. The spots to be designated in this case include any sightseeing spots, famous places/buildings and the like. FIG. 5 shows some samples of sightseeing spots designated in this manner as on-map target spots discriminable or displayable on a map of Aich Prefecture.

Regarding the places/buildings to be designated as on-map target spots, it will be preferable to select temples, popular restaurants or others. For example, it will be preferable that the navigation system 1 has the capability of allowing each user to retrieve or search any intended place/building from a great amount of data stored in a built-in memory device or in a detachable memory medium through interactive procedures repeating questions and answers between the navigation system 1 (i.e., electronic control unit 36) and the user, or allowing the user to access a huge commercial database through an internet or equivalent network system to find out the place/building in his/her mind. The stops obtained in this manner through the retrieval or search operation can be set as user-defining on-map targets.

Furthermore, it is preferable to allow each user to designate a on-map target by pointing any arbitrary spot on a currently displayed map, so that the user can randomly select any places/buildings as on-map target spots regardless of their fame or attributes.

Namely, in step S150, the display unit 28 shows on its screen the selected spots as the designated on-map target spots. At the same time, judgement information for each of the designated on-map target spots is stored in the external memory 32. The judgement information stored in this case includes the conditions having been not fulfilled yet. After accomplishing the step S150, the processing for setting on-map target spots ends.

Next, the processing for judging the condition for each on-map target being set as described above will be explained. Details of this processing change depending on the nature of each on-map target. First explained hereinafter is for on-map target regions. Later explained is for on-map target spots. The processing for judging the condition for each on-map target is executed repetitively after finishing the above-described processing for setting on-map target regions or spots.

Figure 6:
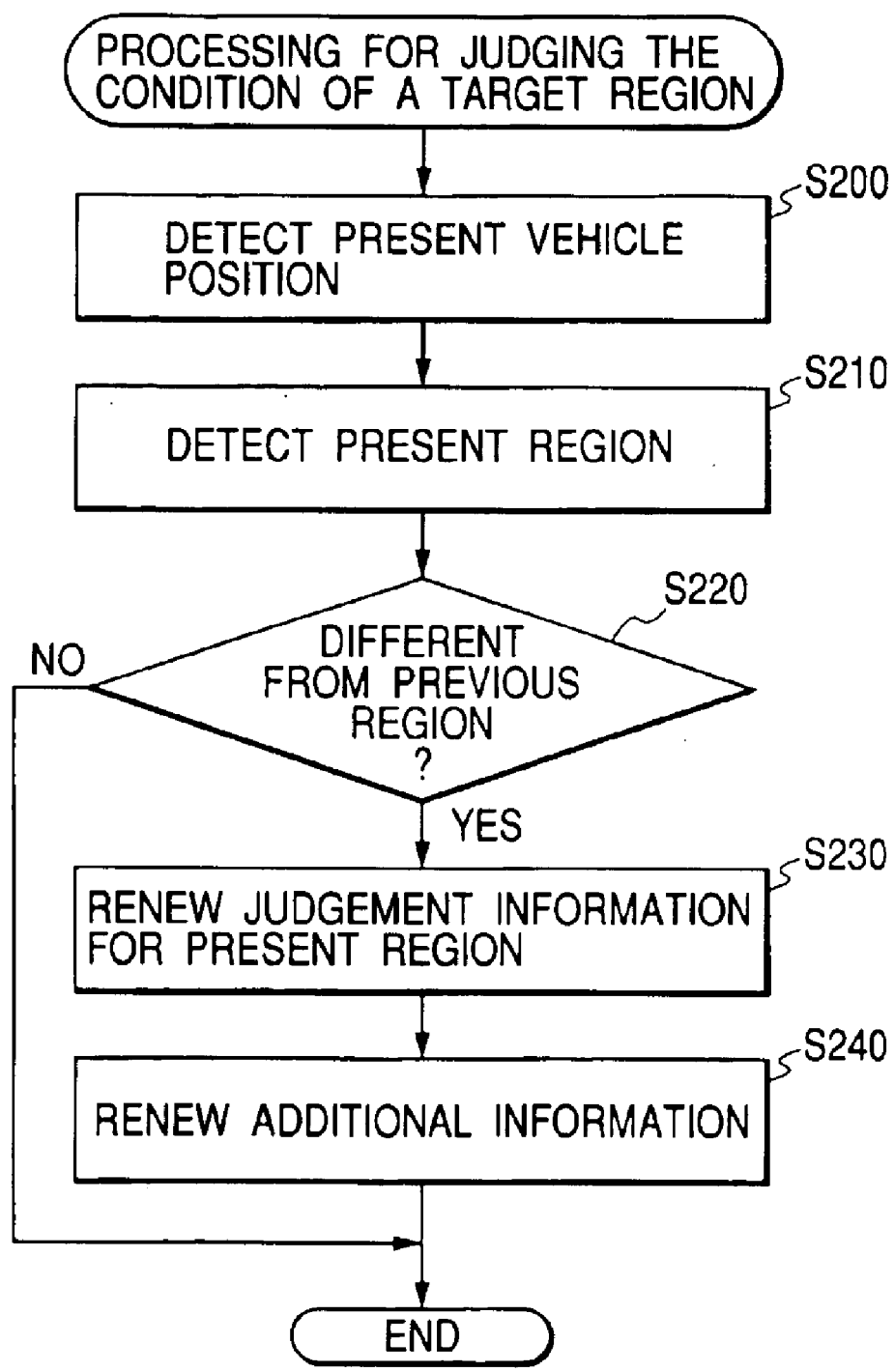
FIG. 6 is a flowchart showing the processing for judging the conditions of each on-map target region in accordance with the preferred embodiment of the present invention.

FIG. 6 is a flowchart showing the processing for judging the condition of each on-map target region in accordance with the preferred embodiment of the present invention.

First, in step S200, a present vehicle position is detected. For this processing, the position detector 22 measures the present position of the vehicle.

Next, in step S210, a present region is detected. This processing is for judging and identifying a region where the vehicle is currently running or stays among a plurality of on-map target regions being set on a map. Identifying the region in which the vehicle is currently present is performed based on the information of present vehicle position obtained in the step S200 and also based on the boundary information of the on-map target regions.

Next, in step S220, it is judged whether the on-map target region identified as currently encompassing or accommodating the vehicle is different from a on-map target region in which the vehicle was located in the previous judging step. When the vehicle has just entered into a new on-map target region which is different from but is next to the previous on-map target region where the vehicle was located in the previous judging step (i.e., YES in step S220), the control flow proceeds to step S230. On the other hand, when the vehicle remains in the same on-map target region (i.e., NO in step S220), the control flow skips the steps S230 and S240 and terminates the processing for judging the condition of each on-map target region.

In step S230, the judgement information for the vehicle newly entered on-map target region (i.e., the new on-map target region into which the vehicle has just entered) is renewed. The condition for this objective on-map target region is fulfilled as soon as the vehicle enters into this on-map target region. The judgement information indicating this fact (i.e., fulfillment of the condition) is stored in the external memory 32.

Next, in step S240, additional information for the objective on-map target region (i.e., the vehicle newly entered on-map target region) is renewed.

According to this embodiment, the additional information for the objective on-map target region includes the number of times (i.e., frequency) with respect to entry of the vehicle into the objective on-map target region as well as the date/time of each entry of the vehicle into this objective on-map target region. In other words, the number of times with respect to the fulfillment of the condition for the objective on-map target region is incremented by one and the date/time of each fulfillment is memorized. After finishing the step S240, the processing for judging the condition of each on-map target region ends.

The processing for judging the conditions of each on-map target region performed in the steps S200 to S220 is realized by utilizing the conventionally known technique for guiding the boundaries of the prefectures in the case that the on-map target regions are dissected according to the border lines of the prefectures.

The above-described processing for judging the condition of each on-map target region will be explained hereinafter in more detail with reference to FIG. 7.

Figure 7:
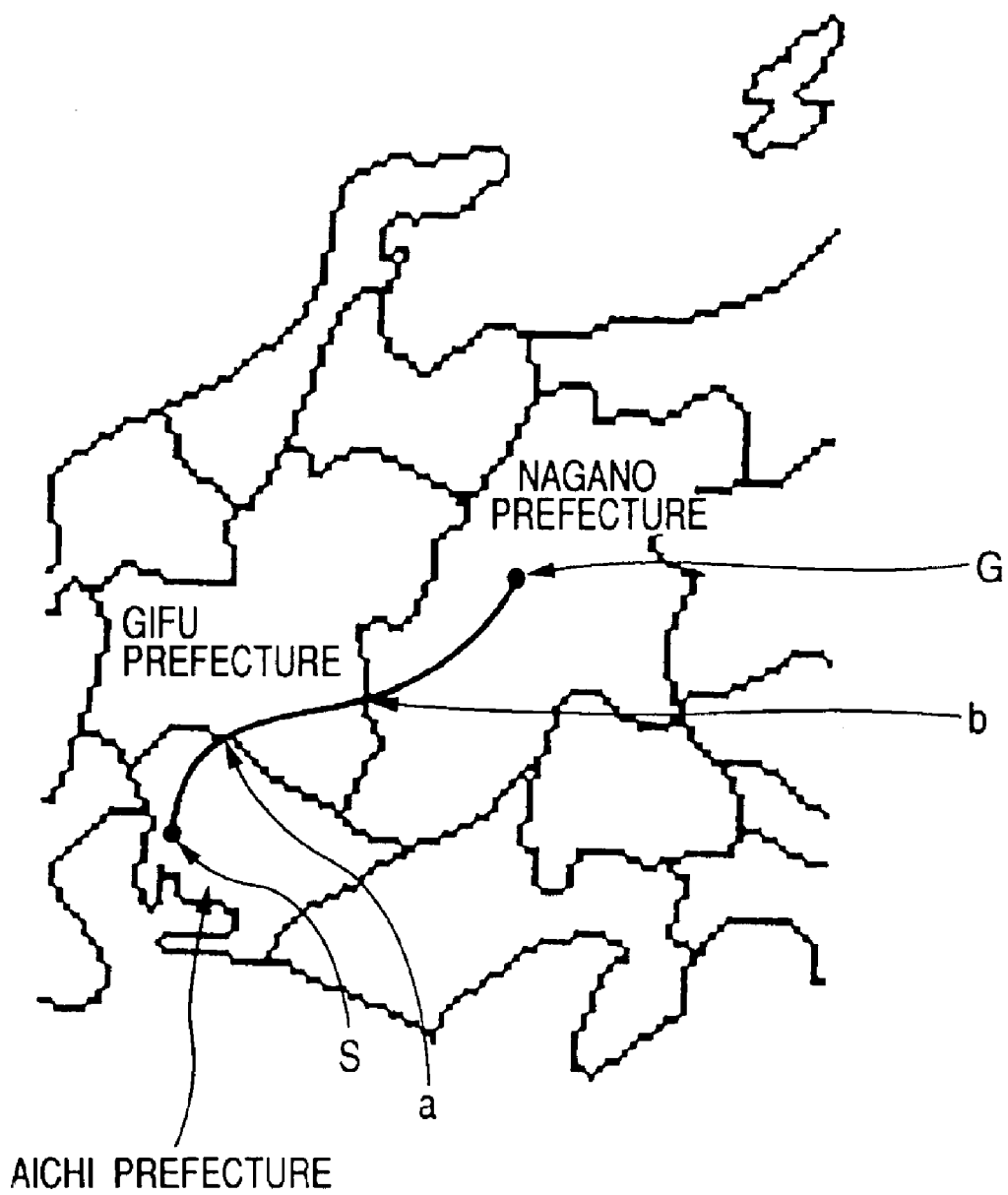
FIG. 7 is a diagram showing an example of judgement of the conditions for respective target regions.

In FIG. 7, a start point S of the vehicle is located in Aichi Prefecture. A goal point G is set in Nagano Prefecture. A driving route is set so as to pass Gifu Prefecture in the way from Aichi to Nagano.

After the vehicle starts the point S, the on-map target region representing Aichi Prefecture is obtained as the present region (in the steps S200 and S210 of FIG. 6) until the vehicle arrives at a predetermined point 'a' located on the border line between Aichi Prefecture and Gifu Prefecture.

However, immediately after the vehicle passes the point 'a', i.e., as soon as the vehicle has crossed the border line between Aichi Prefecture and Gifu Prefecture, the on-map target region representing Gifu Prefecture is obtained as the present region (in the steps S200 and S210 of FIG. 6). Accordingly, it is judged in step S220 that the present region of the vehicle is different from the previous region where the vehicle was located in the previous judging step. The judgement result in step S220 becomes YES. Thus, in step S230, the judgement information for the on-map target region corresponding to Gifu Prefecture is renewed based on the fact that the vehicle is currently running or stays in this on-map target region (i.e., Gifu Prefecture). In this case, the condition for the vehicle newly entered on-map target region representing Gifu Prefecture is fulfilled at this moment. Then, in step S240, the number of times with respect to the fulfillment of the condition for Gifu Prefecture is incremented by one and the date/time of this fulfillment is newly memorized as additional information for Gifu Prefecture.

Similarly, immediately after the vehicle passes the point 'b', i.e., as soon as the vehicle has crossed the border line between Gifu Prefecture and Nagano Prefecture, the on-map target region representing Nagano Prefecture is obtained as the present region (in the steps S200 and S210 of FIG. 6). Accordingly, it is judged in step S220 that the present region of the vehicle is different from the previous region where the vehicle was located in the previous judging step. The judgement result in step S220 becomes YES. Thus, in step S230, the judgement information for the on-map target region corresponding to Nagano Prefecture is renewed based on the fact that the vehicle is currently running or stays in this on-map target region (i.e., Nagano Prefecture). In this case, the condition for the vehicle newly entered on-map target region representing Nagano Prefecture is fulfilled at this moment. Then, in step S240, the number of times with respect to the fulfillment of the condition for Nagano Prefecture is incremented by one and the date/time of this fulfillment is newly memorized as additional information for Nagano Prefecture.

Figure 8:
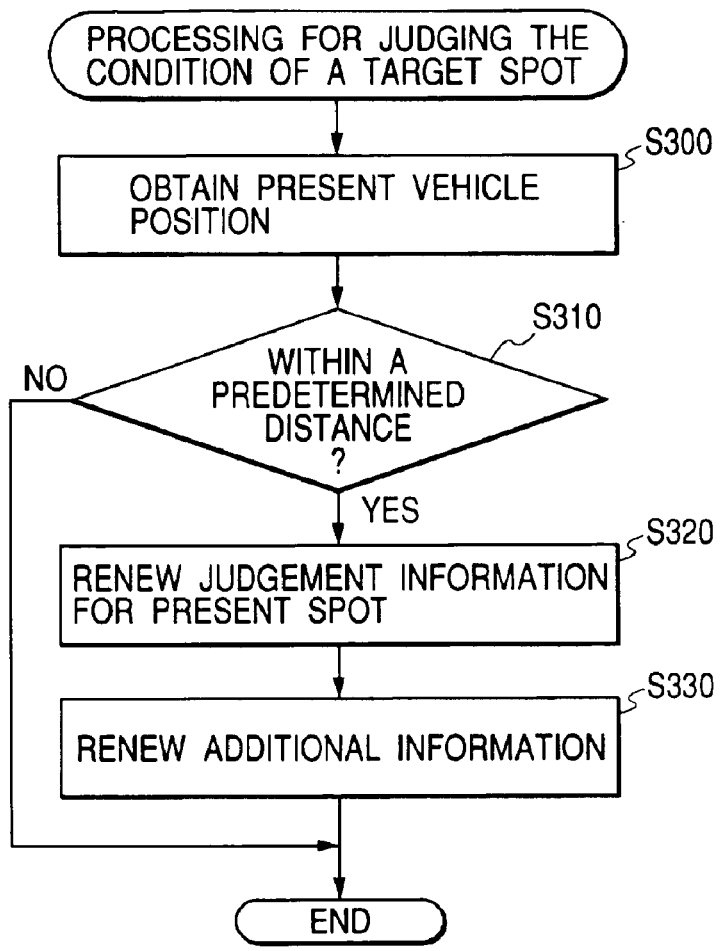
FIG. 8 is a flowchart showing the processing for judging the conditions of each on-map target spot in accordance with the preferred embodiment of the present invention.

FIG. 8 is a flowchart showing the processing for judging the condition of each on-map target spot in accordance with the preferred embodiment of the present invention.

First, in step S300, a present position is detected. For this processing, the position detector 22 measures the present position of the vehicle.

Next, in step S310, it is judged whether the on-map target spot is located within a predetermined range (e.g., within a radius of 300 m) from the vehicle with reference to the present position of the vehicle detected in the step S300.

When the vehicle is within the designated range (i.e., YES in step S310), it is recognized that the vehicle has substantially reached this on-map target spot. The control flow proceeds to step S320. On the other hand, when the vehicle is out of the designated range (i.e., NO in step S310), the control flow skips the steps S320 and S330 and terminates the processing for judging the condition of each on-map target spot.

In step S320, the judgement information for the vehicle just arrived on-map target spot (i.e., the on-map target spot at which the vehicle has just arrived) is renewed. The condition for this objective on-map target spot is fulfilled at this moment based on the fact that the vehicle has just arrived at this on-map target spot. The judgement information indicating this fact (i.e., fulfillment of the condition) is stored in the external memory 32.

Next, in step S330, additional information for the objective on-map target spot (i.e., the vehicle just arrived on-map target spot) is renewed. According to this embodiment, the additional information for the objective on-map target spot includes the number of times (i.e., frequency) with respect to arrival of the vehicle at the objective on-map target spot as well as the date/time of each arrival of the vehicle at this objective on-map target spot. In other words, the number of times with respect to the fulfillment of the condition for the objective on-map target spot is incremented by one and the date/time of each fulfillment is memorized. After finishing the step S330, the processing for judging the condition of each on-map target spot ends.

Through the condition judging processing explained with reference to FIG. 6 or FIG. 8, each entry of the vehicle into the on-map target region or each arrival of the vehicle at the on-map target spot can be recognized and then the judgement information and the corresponding additional information are memorized.

Hereinafter, the processing for informing the fulfillment/nonfulfillment of the condition for each on-map target region or spot will be explained.

Figure 9:
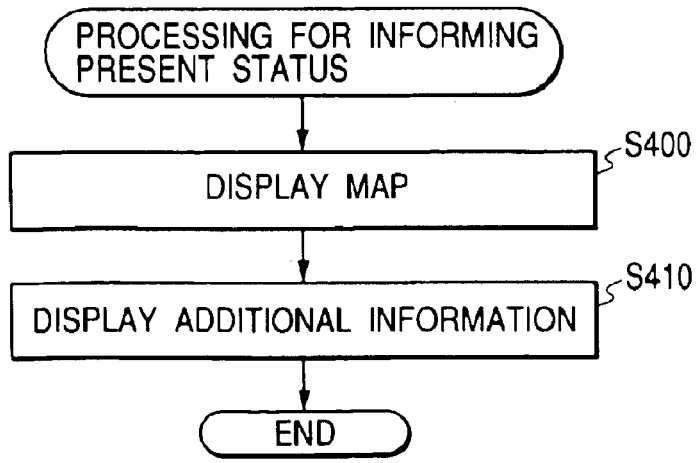
FIG. 9 is a flowchart showing the processing for informing the present status as to fulfillment/nonfulfillment of respective conditions in accordance with the preferred embodiment of the present invention.

FIG. 9 is a flowchart showing the processing for informing the present status as to fulfillment/nonfulfillment of the condition for each on-map target region or spot in accordance with the preferred embodiment of the present invention. This processing succeeds to the above-described processing for judging the condition of each on-map target region or spot. However, it will be possible to execute this processing in response to instruction or request from the user.

First, in step S400, a map is displayed. The display of a map is performed in such a manner that the fulfillment/nonfulfillment of the condition for each of the on-map targets (i.e., target regions or target spots) is discriminable from each other on a map which includes the on-map targets.

Next, in step S410, the additional information for each of the on-map targets is displayed. As described above, the additional information includes the number of times with respect to the fulfillment of the condition for each on-map target as well as the date/time of each fulfillment. Each additional information is displayed on or beside the corresponding on-map target. The display unit 28 performs the procedures required in the steps S400 and S410. After finishing the step S410, the processing for informing fulfillment/nonfulfillment of the condition ends.

One example of the above-described informing processing will be explained with reference to FIG. 7.

As described above, the driving route is set from the start point S in Aichi Prefecture to the goal point G in Nagano Prefecture. In this case, it is assumed that the condition for Aichi Prefecture encompassing the start point S is already fulfilled at the beginning.

First, the vehicle leaving the start point S runs along the driving route toward the border line between Aichi Prefecture and Gifu Prefecture.

Figure 10A:
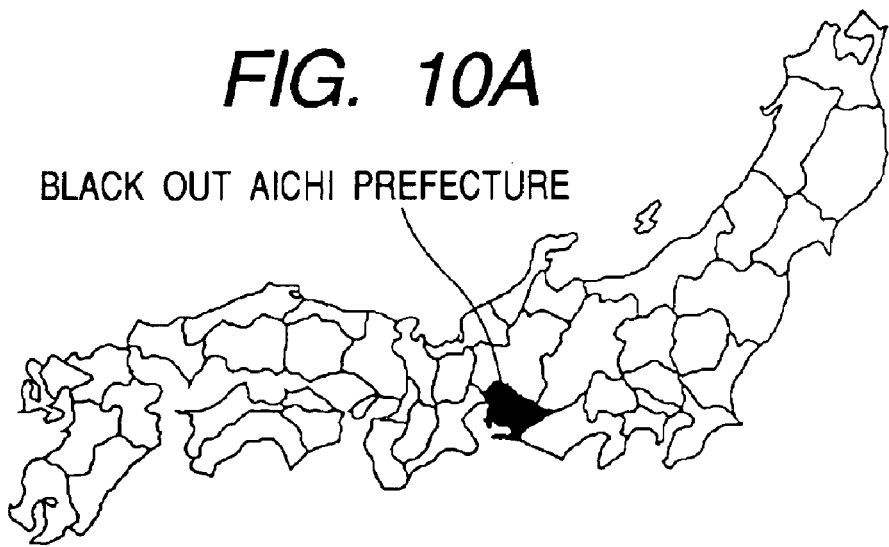
FIGS. 10A to 10C are diagrams showing an example of map images displayed in the informing processing in accordance with the preferred embodiment of the present invention.

FIG. 10A shows a map image displayed on the screen of display unit 28 during a first stage of the journey of vehicle beginning from the start point S in Aichi Prefecture and ending temporarily at the first intermediate point 'a' positioned on the border line between Aichi Prefecture and Gifu Prefecture. According to the preferred embodiment of the present invention, the whole region representing Aichi Prefecture is shown as a black region in contrast with the remaining prefectures being shown as white regions.

After passing the first intermediate point 'a', the vehicle enters into Gifu Prefecture. At this moment, the judgement information for the on-map target region corresponding to Gifu Prefecture is renewed (refer to step S230 of FIG. 6) based on the fact that the vehicle is currently running or stays in this on-map target region (i.e., Gifu Prefecture). The judgement information indicting the fulfillment of the condition for Gifu Prefecture is memorized in the external memory 32. Then, the map image displayed in FIG. 10A is changed into the one displayed in FIG. 10B (refer to step S400 of FIG. 6).

Figure 10B:
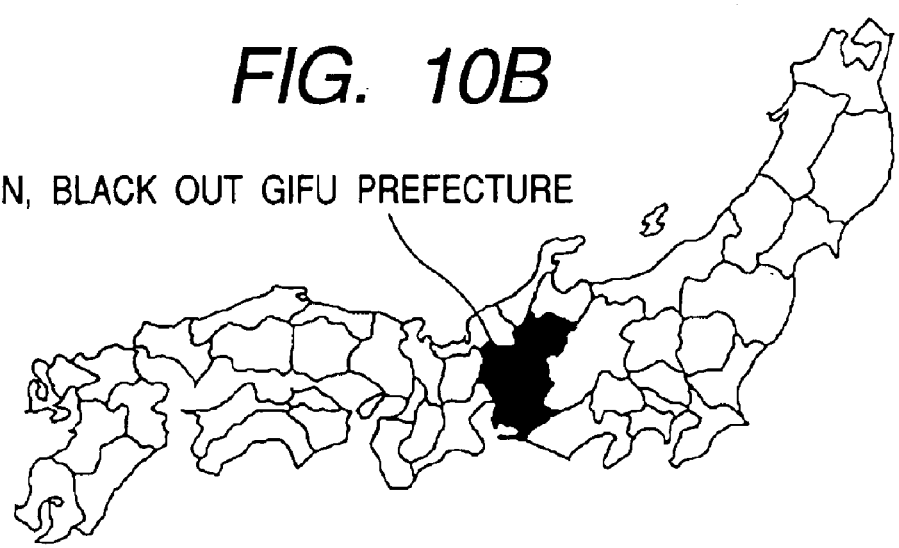

FIG. 10B shows a map image displayed on the screen of display 28 during a second stage of the journey of vehicle beginning again from the first intermediate point 'a' and ending temporarily at the second intermediate point 'b' positioned on the border line between Gifu Prefecture and Nagano Prefecture. According to the preferred embodiment of the present invention, the whole region representing Gifu Prefecture is blacked out, i.e., is wholly turned into a black region. Thus, in addition to the already blacked-out region representing Aichi Prefecture, the whole region of Gifu Prefecture is shown as a black region in contrast with the remaining prefectures being still shown as white regions.

After passing the second intermediate point 'b', the vehicle enters into Nagano Prefecture. At this moment, the judgement information for the on-map target region corresponding to Nagano Prefecture is renewed (refer to step S230 of FIG. 6) based on the fact that the vehicle is currently running or stays in this on-map target region (i.e., Nagano Prefecture). The judgement information indicting the fulfillment of the condition for Nagano Prefecture is memorized in the external memory 32. Then, the map image displayed in FIG. 10B is changed into the one displayed in FIG. 10C (refer to step S400 of FIG. 6).

Figure 10C:
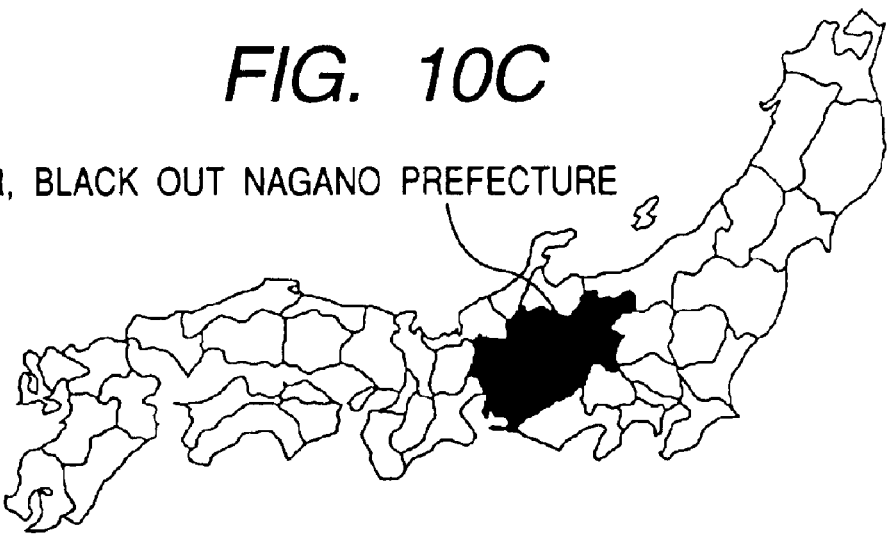

FIG. 10C shows a map image displayed on the screen of display 28 during a final stage of the journey of vehicle beginning again from the second intermediate point 'b' and ending at the goal point G in Nagano Prefecture. According to the preferred embodiment of the present invention, the whole region representing Nagano Prefecture is blacked out, i.e., is wholly turned into a black region. Thus, in addition to the already blacked-out regions representing both of Aichi Prefecture and Gifu Prefecture, the whole region of Nagano Prefecture is shown as a black region in contrast with the remaining prefectures being still shown as white regions.

When the fulfillment/nonfulfillment of the condition for each on-map target region is distinctively displayed in the above-described manner, it is simple to black out each objective on-map target region when the background is a while-based map. However, it is also preferable to use a road map (i.e., a map on which roads are displayed as guidance for driving) instead of using the white-based map. Furthermore, instead of using the method of blacking out the objective on-map target region, it is preferable to change the type and/or size (i.e., thickness) of the boundary lines surrounding the objective on-map target region. It is needless to say that the color used in this map display can be changed appropriately.

Figure 11:
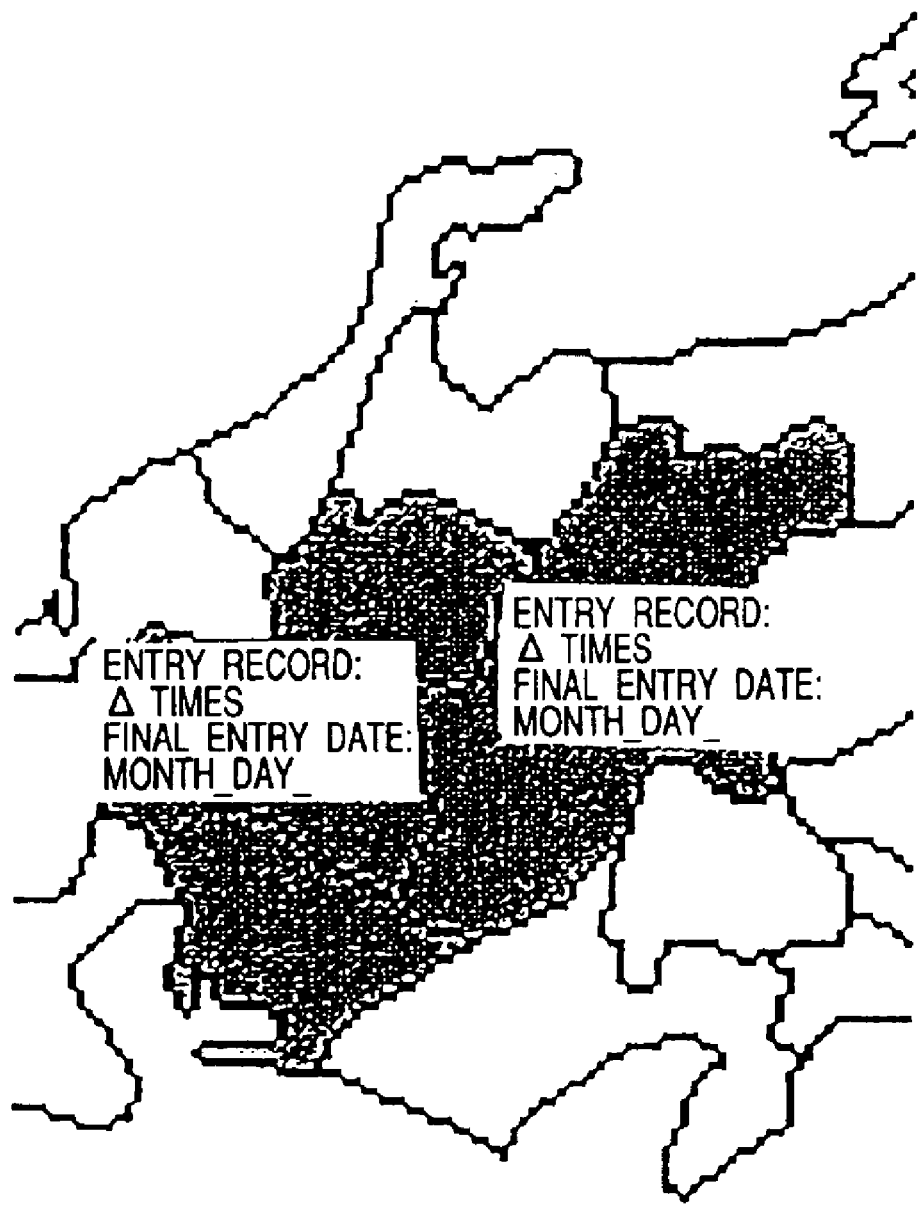
FIG. 11 is a diagram showing an additional information display in accordance with the preferred embodiment of the present invention.

FIG. 11 is a diagram showing an example of additional information display which is performed in the step S410 of FIG. 9. According to the preferred embodiment of the present invention, the number of times with respect to entry of the vehicle into each on-map target region as well as the date/time of the entry are displayed on or beside the blacked-out region indicating the on-map target region whose condition is already fulfilled. The additional information display is, however, not limited to only the numerical data, characters, or any other text data. For example, it will be preferable to change the shade or depth of a color adopted for the objective on-map target region considering the number of times with respect to entry of the vehicle into this on-map target region or according to the date/time of entry.

FIG. 11 shows the example of the additional information display for the on-map target regions. However, similar additional information display can be realized even when the user selects a group of spots as on-map targets. For example, in the map shown in FIG. 5, it is preferable that each on-map target spot is blacked out when the condition for this on-map target spot is fulfilled in contrast with the remaining white spots whose conditions have not been fulfilled yet. Regarding the additional information, they are displayed on or beside the black-out spot.

The above-described vehicle navigation system 1 brings the following effects.

According to the preferred embodiment of the present invention, all of the prefectures in Japan are designated beforehand as on-map target regions as shown in FIG. 3. Each user is allowed to select a plurality of on-map target regions (refer to the steps S120 and S130 of FIG. 2). The entry of the vehicle into each selected on-map target region is judged (refer to steps S200–S220 of FIG. 6). Then, a judgement is made as to fulfillment/nonfulfillment of the condition for each selected on-map target region. When the condition for the selected on-map target region is fulfilled, the judgement information of each selected on-map target region is renewed (refer to step S230 of FIG. 6). Then, a map display is given so that the fulfillment/nonfulfillment of the condition for each selected on-map target region is discriminable from others on a map (refer to step S400 of FIG. 9).

Furthermore, according to the preferred embodiment of the present invention, all of the sightseeing spots or the like are designated beforehand as on-map target spots as shown in FIG. 5. Each user is allowed to select a plurality of on-map target spots (refer to the steps S140 and S150 of FIG. 2). The arrival of the vehicle at each selected on-map target spot is judged (refer to steps S300 and S310 of FIG. 8). Then, a judgement is made as to the fulfillment/nonfulfillment of the condition for each selected on-map target spot. When the condition for the selected on-map target spot is fulfilled, the judgement information of each selected on-map target spot is renewed (refer to step S320 of FIG. 8). Then, a map display is given so that the fulfillment/nonfulfillment of the condition for each selected on-map target spot is discriminable from others on a map (refer to step S400 of FIG. 9).

In this manner, the on-map targets are set beforehand. The judgement result (i.e., present status) as to fulfillment/nonfulfillment of the predetermined condition for each on-map target is informed to the user. This encourages the user to have an intent to fulfill each given condition on the way of his/her vehicle reaching the goal point of the driving.

According to the above-described embodiment, each user can check the designated on-map targets whose conditions having not been fulfilled yet by watching the screen of the display unit 28 showing the present status as to fulfillment/nonfulfillment of the predetermined condition for each on-map target. More specifically, as shown in FIGS. 10A to 10C, the designated on-map target regions are successively blacked out upon their conditions being fulfilled. The user can easily perceive, at a glance, the result of fulfillment/nonfulfillment of the predetermined condition for each on-map target.

Furthermore, according to the above-described embodiment, the display unit 28 shows on its screen, as additional information, the number of times with respect to the fulfillment of the condition for each on-map target as well as the date/time of each fulfillment (refer to step S410 of FIG. 9). Accordingly, the user can know the detailed information with respect to fulfillment/nonfulfillment of the predetermined condition for each on-map target.

Furthermore, according to the above-described embodiment, the user can instruct either a group of regions or a group of spots as on-map targets (refer to steps S100 and S110). Furthermore, the user can arbitrarily or flexibly select regions or spots from the items listed on a menu screen (refer to steps S120 and S140).

According to the above-described embodiment, the electronic control unit 36 serves as judging and memorizing means, informing means, and setting means of the present invention. The flowchart shown in FIG. 2 explains the function of the setting means of the present invention. Each of the flowcharts shown in FIGS. 6 and 8 explains the function of the judging and memorizing means of the present invention. The flowchart shown in FIG. 9 explains the function of the informing means of the present invention.

The present invention is not limited to the disclosed embodiment and is therefore applicable to any other modified embodiments without departing from the scope of the present invention.

(I) According to the above-described embodiment, entry of the vehicle into an objective on-map target region is the condition assigned to this on-map target region. Furthermore, arrival of the vehicle at an objective on-map target spot is the condition assigned to this on-map target spot.

It is, however, possible to strictly judge the entry or arrival of the vehicle (i.e., fulfillment of the condition for each on-map target) considering the goal point or the intermediate point in the route guidance. For example, according to the example shown in FIG. 7, the goal point G in Nagano Prefecture is set as a destination of the journey. No specific transit spots to be passed by the vehicle are designated beforehand. In this case, at the moment the vehicle enters into the on-map target region representing Gifu Prefecture, a judgement is made as to whether any goal or transit point in Gifu Prefecture is set beforehand. When there is no goal or transit point being set in Gifu Prefecture, it is concluded that the condition for Gifu Prefecture is not fulfilled. Similarly, at the moment the vehicle enters into the on-map target region representing Nagano Prefecture, a judgement is made as to whether any goal or transit point in Nagano Prefecture is set beforehand. As there is the goal point G being set in Nagano Prefecture, it is concluded that the condition for Nagano Prefecture is fulfilled. In this manner, when the entry or arrival of the vehicle is set as the condition to be fulfilled, it is preferable to consider the setting of the target or transit point.

Furthermore, it is preferable to judge the fulfillment of the condition for each on-map target region based on the period of time during which the vehicle is running or stays in this on-map target region. For example, according to the example shown in FIG. 7, the fulfillment of the condition for Gifu Prefecture is judged based on the time required for the vehicle to travel from the first intermediate point 'a' to the second intermediate point 'b'. Such a measurement of required time makes it possible to strictly judge the fulfillment of the condition for the on-map target region representing Gifu Prefecture. Similarly, the time required for the vehicle to travel from the start point S to the first intermediate point 'a' can be used to strictly judge the fulfillment of the condition for the on-map target region representing Aichi Prefecture. And, the time required for the vehicle to travel from the second intermediate point 'b' to the goal point G can be used to strictly judge the fulfillment of the condition for the on-map target region representing Nagano Prefecture.

Furthermore, it is preferable to judge the fulfillment of the condition for each on-map target region based on the traveling distance of the vehicle in this on-map target region. For example, according to the example shown in FIG. 7, the fulfillment of the condition for Gifu Prefecture is judged based on the traveling distance of the vehicle to travel from the first intermediate point 'a' to the second intermediate point 'b'. Such a measurement of traveling distance makes it possible to strictly judge the fulfillment of the condition for the on-map target region representing Gifu Prefecture. Similarly, the traveling distance of the vehicle to travel from the start point S to the first intermediate point 'a' can be used to strictly judge the fulfillment of the condition for the on-map target region representing Aichi Prefecture. And, the traveling distance required for the vehicle to travel from the second intermediate point 'b' to the goal point G can be used to strictly judge the fulfillment of the condition for the on-map target region representing Nagano Prefecture.

Like the on-map target regions, it is possible to rely on the elapse of time during which the vehicle stays on or in the vicinity of each on-map target spot. Furthermore, instead of relying on the required time, it is possible to judge the fulfillment of the condition for each on-map target spot based on clear evidences proving the fact that the vehicle as surely stopped at the objective on-map target spot. For example, such evidences will include some driver's manipulations on the vehicle, such as operations for turning off an ignition key switch, shifting the gear lever to a parking position, pulling a hand-operated brake lever, and unlocking and/or opening any door.

(II) Furthermore, it will bring great benefit to each user if the vehicle navigation system 1 of the present invention allows the user to arbitrarily select, according to his/her preference, the method for judging the fulfillment/nonfulfillment of the condition for each on-map target. In this case, the electronic control unit 36 serves as condition setting means.

(III) Furthermore, it is possible to inform the degree, for example in terms of percentage or ratio, of fulfillment/nonfulfillment of the condition for each on-map target.

Furthermore, it is also possible to use the speaker 30 to give a voice or sound guidance informing the fulfillment/nonfulfillment of the condition for each on-map target.

(IV) Furthermore, it is also possible to use each informed on-map target as a goal or transit point for route guidance. For example, it is desirable to use a touch panel integrated with the display unit 28 so as to allow each user to select, by touching the panel, an intended on-map target displayed on the screen of display unit 28 as a goal or transit point.

When the region is designated as a goal or transit point, it will be convenient for the user if the system allows the user to more accurately designate his/her intended goal or transit spot in this region. It is also possible to automatically designate a prefectural capital or other main city as a goal or transmit point.

What is claimed is:

1. A vehicle navigation system possessing information storing capability, wherein a group of regions or spots on a given map are designated beforehand as on-map targets, said vehicle navigation system comprising:

judging and memorizing means for making a judgment as to whether a predetermined condition for each of the on-map targets is fulfilled or not based on vehicle traveling conditions and for memorizing judgment information obtained as a result of said judgment; and informing means for directly or indirectly informing a user of present status as to fulfillment/nonfulfillment of said predetermined condition for each of said on-map targets based on said judgment information memorized by said judging and memorizing means, wherein fulfillment of said predetermined condition is checked based on a traveling distance of a vehicle when each of said on-map targets represents a predetermined region.

2. The vehicle navigation system in accordance with claim 1, further comprising setting means for setting said group of regions or spots on the given map as each of said on-map targets.

3. The vehicle navigation system in accordance with claim 1, further comprising condition setting means for setting said predetermined condition.

4. The vehicle navigation system in accordance with claim 1, wherein said informing means gives a map display so that fulfillment/nonfulfillment of the predetermined condition for each of said on-map targets is discriminable from others on a map.

5. The vehicle navigation system in accordance with claim 4, wherein said informing means displays a map on which said group of regions or spots are distinctively shown, and gives said map display in such a manner that fulfillment/nonfulfillment of the predetermined condition for each of said on-map targets is discriminable from others on a map.

6. The vehicle navigation system in accordance with claim 5, wherein a color adopted for representing each of said on-map targets is changed considering the present status as to fulfillment/nonfulfillment of the predetermined condition for each of said on-map targets.

7. The vehicle navigation system in accordance with claim 4, wherein at least one of the on-map targets informed by said informing means is usable as a goal or transit point for route guidance.

8. The vehicle navigation system in accordance with claim 4, wherein said judging and memorizing means further memorizes additional information with respect to fulfillment/nonfulfillment of the predetermined condition for each of said on-map targets, and said informing means informs said additional information in connection with a corresponding on-map target of the on-map targets.

9. The vehicle navigation system in accordance with claim 8, wherein said additional information is a number of times with respect to fulfillment of the predetermined condition for each of said on-map targets.

10. The vehicle navigation system in accordance with claim 8, wherein said additional information is time information with respect to fulfillment of the predetermined condition for each of said on-map targets.

11. The vehicle navigation system in accordance with claim 8, wherein said informing means displays said additional information on or beside the corresponding on-map target on a map.

12. The vehicle navigation system in accordance with claim 8, wherein said informing means changes a display pattern of each of said on-map targets based on said additional information in contrast with those of other on-map targets.

13. A vehicle navigation system possessing information storing capability, wherein a group of regions or spots on a given map are designated beforehand as on-map targets, said vehicle navigation system comprising:

judging and memorizing means for making a judgment as to whether a predetermined condition for each of the on-map targets is fulfilled or not based on vehicle traveling conditions and for memorizing judgment information obtained as a result of said judgment; and informing means for directly or indirectly informing a user of present status as to fulfillment/nonfulfillment of said predetermined condition for each of said on-map targets based on said judgment information memorized by said judging and memorizing means, wherein said judging and memorizing means further memorizes additional information with respect to fulfillment/nonfulfillment of the predetermined condition for each of said on-map targets, and said informing means informs said additional information in connection with a corresponding on-map target of the on-map targets, wherein said additional information is a number of times with respect to fulfillment of the predetermined condition for each of said on-map targets.

14. The vehicle navigation system in accordance with claim 13, further comprising setting means for setting said group of regions or spots on the given map as said on-map targets.

15. The vehicle navigation system in accordance with claim 13, further comprising condition setting means for setting said predetermined condition.

16. The vehicle navigation system in accordance with claim 13, wherein said informing means gives a map display so that fulfillment/nonfulfillment of the predetermined condition for each of said on-map targets is discriminable from others on a map.

17. The vehicle navigation system in accordance with claim 16, wherein said informing means displays a map on which said group of regions or spots are distinctively shown, and gives said map display in such a manner that fulfillment/nonfulfillment of the predetermined condition for each of said on-map targets is discriminable from others on a map.

18. The vehicle navigation system in accordance with claim 17, wherein a color adopted for representing each of said on-map targets is changed considering the present status as to fulfillment/nonfulfillment of the predetermined condition for each of said on-map targets.

19. The vehicle navigation system in accordance with claim 16, wherein at least one on-map target of said on-map targets informed by said informing means is usable as a goal or transit point for route guidance.

20. The vehicle navigation system in accordance with claim 13, wherein said informing means displays said additional information on or beside the corresponding on-map target on a map.

21. The vehicle navigation system in accordance with claim 13, wherein said informing means changes a display pattern of each of said on-map targets based on said additional information in contrast with those of other on-map targets.

22. A vehicle navigation system possessing information storing capability, wherein a group of regions or spots on a given map are designated beforehand as on-map targets, said vehicle navigation system comprising:
    judging and memorizing means for making a judgment as to whether a predetermined condition for each of said on-map targets is fulfilled or not based on vehicle traveling conditions and for memorizing judgment information obtained as a result of said judgment; and
    informing means for directly or indirectly informing a user of present status as to fulfillment/nonfulfillment of said predetermined condition for each of said on-map targets based on said judgment information memorized by said judging and memorizing means,
    wherein fulfillment of said predetermined condition is checked based on a period of time during which a vehicle is positioned on each of said on-map targets.

23. The vehicle navigation system in accordance with claim 22, further comprising setting means for setting said group of regions or spots on the given map as said on-map targets.

24. The vehicle navigation system in accordance with claim 22, further comprising condition setting means for setting said predetermined condition.

25. The vehicle navigation system in accordance with claim 22, wherein said informing means gives a map display so that fulfillment/nonfulfillment of the predetermined condition for each of said on-map targets is discriminable from others on a map.

26. The vehicle navigation system in accordance with claim 25, wherein said informing means displays a map on which said group of regions or spots are distinctively shown, and gives said map display in such a manner that fulfillment/nonfulfillment of the predetermined condition for each of said on-map targets is discriminable from others on a map.

27. The vehicle navigation system in accordance with claim 26, wherein a color adopted for representing each of said on-map targets is changed considering the present status as to fulfillment/nonfulfillment of the predetermined condition for each of said on-map targets.

28. The vehicle navigation system in accordance with claim 25, wherein at least one on-map target of said on-map targets informed by said informing means is usable as a goal or transit point for route guidance.

29. The vehicle navigation system in accordance with claim 22, wherein
    said judging and memorizing means further memorizes additional information with respect to fulfillment/nonfulfillment of the predetermined condition for each of said on-map targets, and
    said informing means informs said additional information in connection with a corresponding on-map target of said on-map targets,
    wherein said additional information is time information with respect to fulfillment of the predetermined condition for each of said on-map targets.

30. The vehicle navigation system in accordance with claim 22, wherein
    said judging and memorizing means further memorizes additional information with respect to fulfillment/nonfulfillment of the predetermined condition for each of said on-map targets, and
    said informing means informs said additional information in connection with a corresponding on-map target of said on-map targets,
    wherein said informing means displays said additional information on or beside the corresponding on-map target on a map.

31. The vehicle navigation system in accordance with claim 22, where
    said judging and memorizing means further memorizes additional information with respect to fulfillment/nonfulfillment of the predetermined condition for each of said on-map targets, and
    said informing means informs said additional information in connection with a corresponding on-map target of said on-map targets,
    wherein said informing means changes a display pattern of each of said on-map targets based on said additional information in contrast with those of other on-map targets.

32. A vehicle navigation system possessing information storing capability, wherein a group of regions on a given map are designated beforehand as on-map targets, said vehicle navigation system comprising:
    judging and memorizing means for making a judgment as to whether a predetermined condition for each of said on-map targets is fulfilled or not based on vehicle traveling conditions and for memorizing judgment information obtained as a result of said judgment; and
    informing means for directly or indirectly informing a user of present status as to fulfillment/nonfulfillment of said predetermined condition for said each of said on-map targets based on said judgment information memorized by said judging and memorizing means,
    wherein said fulfillment/nonfulfillment of said predetermined condition for each of said on-map targets is judged based on entry of a vehicle into each region.

33. The vehicle navigation system in accordance with claim 32, further comprising setting means for setting said group of regions on the given map as said on-map targets.

34. The vehicle navigation system in accordance with claim 32, further comprising condition setting means for setting said predetermined condition.

35. The vehicle navigation system in accordance with claim 32, wherein said informing means gives a map display so that fulfillment/nonfulfillment of the predetermined condition for each of said on-map targets is discriminable from others on a map.

36. The vehicle navigation system in accordance with claim 35, wherein said informing means displays a map on which said group of regions are distinctively shown, and gives said map display in such a manner that fulfillment/nonfulfillment of the predetermined condition for each of said on-map targets is discriminable from others on a map.

37. The vehicle navigation system in accordance with claim 36, wherein a color adopted for representing each of said on-map targets is changed considering the present status as to fulfillment/nonfulfillment of the predetermined condition for each of said on-map targets.

38. The vehicle navigation system in accordance with claim 35, wherein at least one on-map target of said on-map targets informed by said informing means is usable as a goal or transit point for route guidance.

39. The vehicle navigation system in accordance with claim 35, wherein
    said judging and memorizing means further memorizes additional information with respect to fulfillment/nonfulfillment of the predetermined condition for each of said on-map targets, and
    said informing means informs said additional information in connection with a corresponding on-map target of said on-map targets.

40. The vehicle navigation system in accordance with claim 39, wherein said additional information is a number of times with respect to fulfillment of the predetermined condition for each of said on-map targets.

41. The vehicle navigation system in accordance with claim 39, wherein said additional information is time information with respect to fulfillment of the predetermined condition for each of said on-map targets.

42. The vehicle navigation system in accordance with claim 39, wherein said informing means displays said additional information on or beside said corresponding on-map target on a map.

43. The vehicle navigation system in accordance with claim 39, wherein said informing means changes a display pattern of each of said on-map targets based on said additional information in contrast with those of other on-map targets.

44. A vehicle navigation system possessing information storing capability, where a group of regions on a given map are designated beforehand as on-map targets, said vehicle navigation system comprising:
    judging and memorizing means for making a judgment as to whether a predetermined condition for each of said on-map targets is fulfilled or not based on vehicle traveling conditions and for memorizing judgment information obtained as a result of said judgment; and
    informing means for directly or indirectly informing a user of present status as to fulfillment/nonfulfillment of said predetermined condition for each of said on-map targets based on said judgment information memorized by said judging and memorizing means,
    wherein fulfillment of said predetermined condition is judged by checking whether or not a goal or any transit point in a route guidance is present in a region where a vehicle enters.

45. The vehicle navigation system in accordance with claim 44, further comprising setting means for setting said group of regions on the given map as said on-map targets.

46. The vehicle navigation system in accordance with claim 44, further comprising condition setting means for setting said predetermined condition.

47. The vehicle navigation system in accordance with claim 44, wherein said informing means gives a map display so that fulfillment/nonfulfillment of the predetermined condition for each of said on-map targets is discriminable from others on a map.

48. The vehicle navigation system in accordance with claim 47, wherein said informing means displays a map on which said group of regions are distinctively shown, and gives said map display in such a manner that fulfillment/nonfulfillment of the predetermined condition for each of said on-map targets is discriminable from others on a map.

49. The vehicle navigation system in accordance with claim 48, wherein a color adopted for representing each of said on-map targets is changed considering the present status as to fulfillment/nonfulfillment of the predetermined condition for each of said on-map targets.

50. The vehicle navigation system in accordance with claim 47, wherein at least one on-map target of said on-map targets informed by said informing means is usable as a goal or transit point for route guidance.

51. The vehicle navigation system in accordance with claim 47, wherein
    said judging and memorizing means further memorizes additional information with respect to fulfillment/nonfulfillment of the predetermined condition for each of said on-map targets, and
    said informing means informs said additional information in connection with a corresponding on-map target of said on-map targets.

52. The vehicle navigation system in accordance with claim 51, wherein said additional information is a number of times with respect to fulfillment of the predetermined condition for each of said on-map targets.

53. The vehicle navigation system in accordance with claim 51, wherein said additional information is time information with respect to fulfillment of the predetermined condition for each of said on-map targets.

54. The vehicle navigation system in accordance with claim 51, wherein said informing means displays said additional information on or beside said corresponding on-map target on a map.

55. The vehicle navigation system in accordance with claim 51, wherein said informing means changes a display pattern of each of said on-map targets based on said additional information in contrast with those of other on-map targets.

56. A vehicle navigation system possessing information storing capability, where a group of spots on a given map are designated beforehand as on-map targets, said vehicle navigation system comprising:
    judging and memorizing means for making a judgment as to whether a predetermined condition for each of said on-map targets is fulfilled or not based on vehicle traveling conditions and for memorizing judgment information obtained as a result of said judgment; and
    informing means for directly or indirectly informing a user of present status as to fulfillment/nonfulfillment of said predetermined condition for each of said on-map targets based on said judgment information memorized by said judging and memorizing means,
    wherein fulfillment of said predetermined condition is judged by checking driver's manipulations on the vehicle including operations for turning off an ignition key switch, shifting a gear lever to a parking position, pulling a hand-operated brake lever, and unlocking and/or opening any door.

57. The vehicle navigation system in accordance with claim 56, further comprising setting means for setting said group of spots on the given map as said on-map targets.

58. The vehicle navigation system in accordance with claim 56, further comprising condition setting means for setting said predetermined condition.

59. The vehicle navigation system in accordance with claim 56, wherein said informing means gives a map display so that fulfillment/nonfulfillment of the predetermined condition for each of said on-map targets is discriminable from others on a map.

60. The vehicle navigation system in accordance with claim 59, wherein said informing means displays a map on which said group of spots are distinctively shown, and gives said map display in such a manner that fulfillment/nonfulfillment of the predetermined condition for each of said on-map targets is discriminable from others on a map.

61. The vehicle navigation system in accordance with claim 60, wherein a color adopted for representing each of said on-map targets is changed considering the present status as to fulfillment/nonfulfillment of the predetermined condition for each of said on-map targets.

62. The vehicle navigation system in accordance with claim 59, wherein at least one on-map target of said on-map targets informed by said informing means is usable as a goal or transit point for route guidance.

63. The vehicle navigation system in accordance with claim 59, wherein said judging and memorizing means further memorizes additional information with respect to fulfillment/nonfulfillment of the predetermined condition for each of said on-map targets, and said informing means informs said additional information in connection with a corresponding on-map target of said on-map targets.

64. The vehicle navigation system in accordance with claim 63, wherein said additional information is a number of times with respect to fulfillment of the predetermined condition for each of said on-map targets.

65. The vehicle navigation system in accordance with claim 63, wherein said additional information is time information with respect to fulfillment of the predetermined condition for each of said on-map targets.

66. The vehicle navigation system in accordance with claim 63, wherein said informing means displays said additional information on or beside said corresponding on-map target on a map.

67. The vehicle navigation system in accordance with claim 63, wherein said informing means changes a display pattern of each of said on-map targets based on said additional information in contrast with those of other on-map targets.

* * * * *